May 24, 1955
E. H. LAND
2,708,864
PHOTOGRAPHIC APPARATUS
Filed June 12, 1952
3 Sheets-Sheet 1
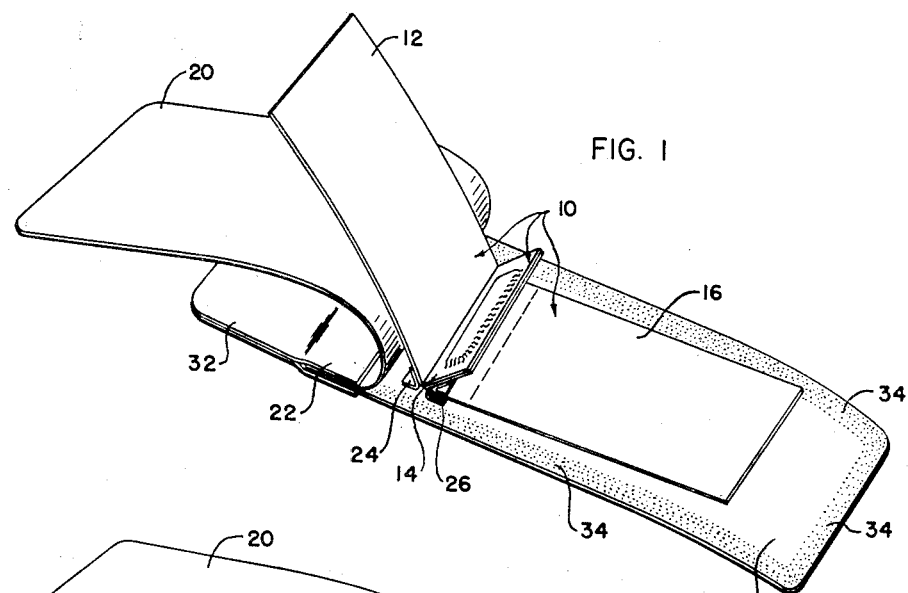
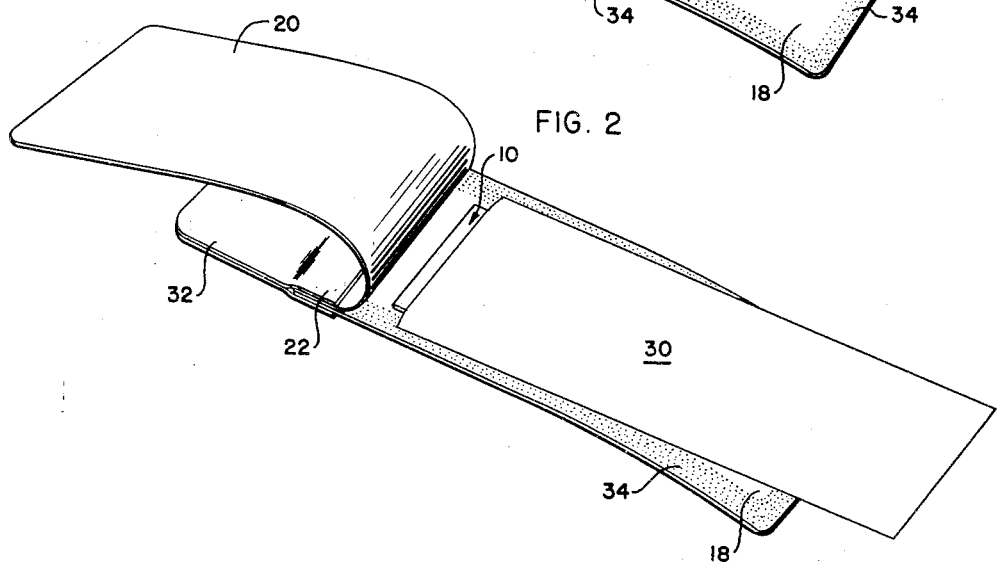
INVENTOR
Edwin H. Land
BY Bravard Mikulka
and
Gerald Altman
Attorneys May 24, 1955  E. H. LAND  2,708,864
PHOTOGRAPHIC APPARATUS
Filed June 12, 1952  3 Sheets-Sheet 2

INVENTOR
Edwin H. Land

BY Brown and Mikulka
and
Gerald Altman
ATTORNEYS

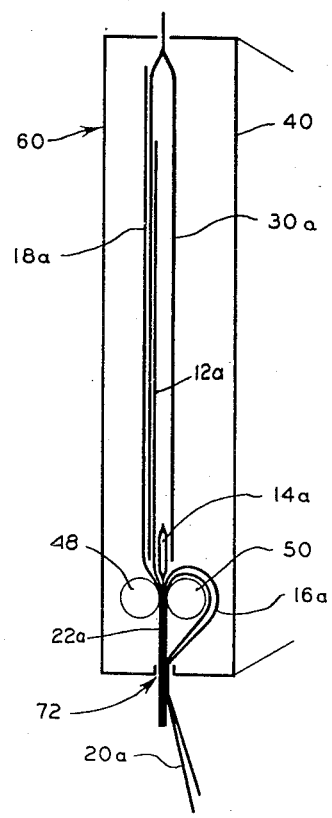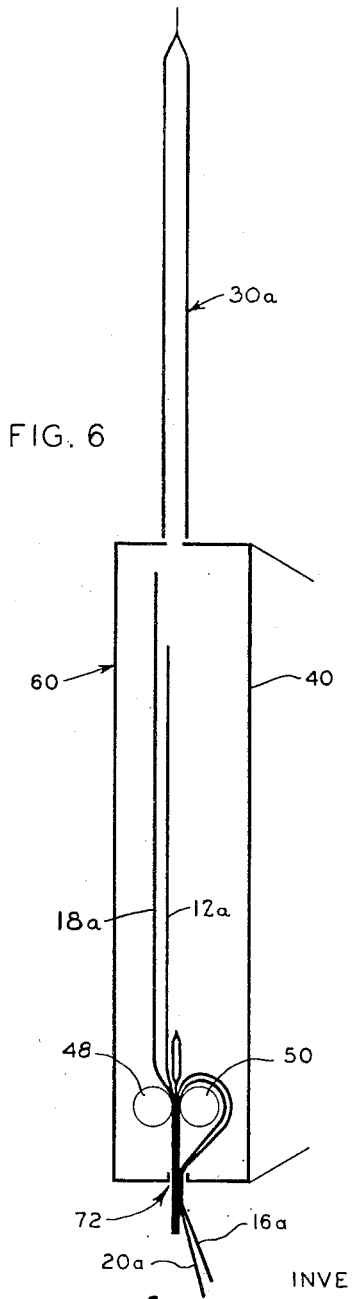

United States Patent Office 2,708,864
Patented May 24, 1955

2,708,864

PHOTOGRAPHIC APPARATUS

Edwin H. Land, Cambridge, Mass., assignor to Polaroid Corporation, Cambridge, Mass., a corporation of Delaware Application June 12, 1952, Serial No. 293,166

5 Claims. (Cl. 95—89)

This invention relates to photography and more particularly to photographic apparatus.

This application is a continuation-in-part of my application Serial No. 594,892, filed May 21, 1945, now Patent No. 2,609,296 issued September 22, 1952 for Composite Photographic Product Comprising a Photosensitive Element and a Container Carrying a Liquid for Processing said Element.

It is an object of the present invention to provide a photographic magazine wherein a specially constructed composite photographic film assembly may be loaded in daylight without exposing the photosensitive layer thereof.

Other objects are: to provide a magazine comprising a front section and a rear section, the edge portions of said rear section, when aligned and juxtaposed with the edge portions of said front section, being so constituted as to be in light-tight engagement therewith whereby a chamber is defined by the sections, a pair of edge portions of the rear section defining in conjunction with a pair of edge portions of the front section a pair of passages, and light-seal means for rendering said passages lighttight, at least one of the sections providing a path through which actinic radiation may enter the chamber; to provide a magazine of the above type comprising means for pivotally connecting edge portions of the front and rear sections; to provide a magazine of the above type wherein at least one of the sections has edge portions which include shoulders extending therealong; to provide a magazine of the above type wherein guide means are provided for predeterminedly positioning a specially constructed composite film assembly within the chamber; to provide a magazine of the aforementioned type wherein the guide means and the pair of passages are so aligned as to enable portions of the aforementioned film assembly, when predeterminedly positioned by the guide means, to extend through the pair of passages; and to provide a magazine of the above type which is inexpensive in construction and simple in operation.

These and other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein:

Figure 1 is a perspective view of one form of film assembly comprehended for use in a magazine embodying the present invention, the assembly being shown for purposes of clarity with several of the laminae thereof separated from one another;

Fig. 2 is a view, similar to Fig. 1, of the film assembly of Fig. 1, showing an additional novel light barrier for the photosensitive layer of the film assembly;

Figs. 5 and 6 are diagrammatic views illustrating the details of the construction of a modification of the aforementioned film assembly and the manner in which it may be exposed within the magazine of Figs. 3 and 4.

Figure 3:
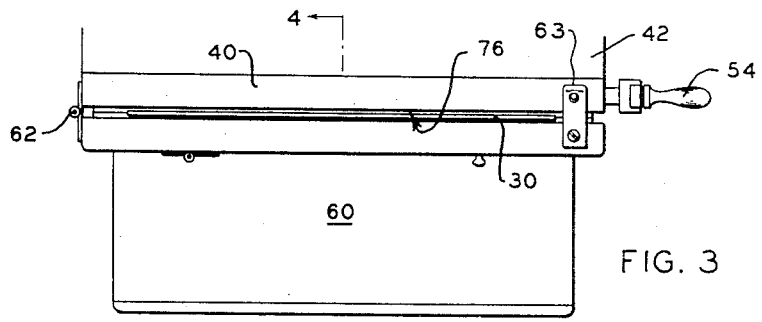
Fig. 3 is a top plan view, with parts broken away, of a magazine embodying the present invention, the magazine being adapted to utilize the aforementioned film assembly to obtain fixed positive images.

Referring to Fig. 1, there is shown one form of film assembly comprehended for use in a magazine embodying the present invention. As illustrated, this film assembly comprises a film unit 10 of the type shown in Patent No. 2,543,181, issued on February 27, 1951 to Edwin H. Land for Photographic Product Comprising a Rupturable Container Carrying a Photographic Processing Liquid.

In a preferred form, film unit 10 comprises a film 12 which includes a layer of photosensitive material, preferably of the type which is rendered developable by exposure to light, e. g., an emulsion of silver halide, or of a mixture of silver halides, or of a mixed silver halide, mounted on a suitable transparent support such as a sheet of cellulose acetate, cellulose nitrate or cellulose acetate butyrate; a liquid reagent releasably carried out of contact with the photosensitive layer in a suitable container 14; and a base 16 preferably formed of a relatively liquid-absorbent, liquid-permeable material in which or on which a positive image of the subject matter of a latent image formed in the photosensitive layer may be obtained when the liquid material in container 14 is spread between film 12 and the base. It is understood that the photosensitive emulsion side of film 12 adjoins base 16 when the film and the base are in operative assembly.

Base 16 may serve as the only receiving layer for the image-forming component which provides the desired fixed positive image so that the image is entirely formed therein, or it may serve as a support on which the image-receiving layer is formed by the reagent, or it may cooperate with a receiving layer formed by the reagent so that part of the positive image is obtained in the base and part in the receiving layer.

Container 14 (Fig. 1) for the liquid reagent is preferably an elongated, water-vapor impervious and oxygen-impervious sac or pod which is mounted transversely of the film unit between film 12 and base 16 adjacent one edge of the film and preferably beyond that portion of the film which is intended for exposure and which may be termed a frame. Container 14 may, for example, be formed of a single sheet of water-vapor and oxygen-impervious material such as a wax-coated metal foil, and is preferably detachably secured as by adhesion to base 16 or film 12, being so formed that the application of a suitable mechanical stress thereto as, for example, the squeezing together of the faces of the film unit, will release the liquid reagent in the container in only one direction longitudinally of the film so as to spread the reagent between the base and the photosensitive layer of the film.

To insure a complete and relatively uniform permeation of the frame of the photosensitive layer of film 12 upon release of the reagent, the reagent is relatively viscous, preferably having a viscosity in excess of fifty centipoises. A reagent having a lesser viscosity may be used, but if substantially less viscous the reagent may be too greatly absorbed in some portions of the photosensitive layer while other portions remain relatively dry whereby the uniformity of the image which is obtained may be affected. The thickening agent may be a water-soluble, film-forming material such as a high molecular weight polymer or protein, as, for example, gelatin or a polymeric, water-soluble ether inert to an alkali solution, such as hydroxyethyl cellulose or a metal salt of carboxymethyl cellulose, for example sodium or aluminum carboxymethyl cellulose, which, when spread over a water-absorbent base, while in contact with a photosensitive layer, quickly forms a relatively firm, dimensionally stable film. If a reagent of this character is utilized and if base 16 is formed of a water-absorbent material such as alpha paper, a fixed, positive image is obtained in part in the base and in part in the film formed by the reagent.

One form of liquid reagent includes as ingredients a developer for reducing exposed silver halide to silver and a compound for reacting with the undeveloped silver halide to form a silver complex soluble in the reagent. The materials are selected so that the complex-forming reaction takes place at a less rapid rate than the rate at which the developer will reduce the exposed silver salt but at a more rapid rate than the rate at which the developer will reduce the unexposed silver salt whereby a predetermined portion of the unexposed silver salt is transformed to the soluble complex. The reagent preferably also contains an alkali. By subjecting film unit 10 to a compressive force subsequent to exposure of film 12, the reagent in container 14 is released between base 16 and the film and provides in or on the base a positive image of the subject matter to which the film was exposed.

In order that film unit 10, when predeterminedly positioned within a magazine embodying the present invention, may be exposed and then, after exposure, withdrawn from the magazine into the daylight without effecting further exposure of the photosensitive layer thereof, there is provided, in combination with the film unit, a novel arrangement of elements which cooperates with the film unit as the latter is withdrawn from the magazine to provide a lighttight envelope.

As shown, a pair of light-impervious sheets 18 and 20, for example of black paper, are provided on opposite sides of unit 10 and are secured together at one end by a suitable hinge 22. The elements of film unit 10 may be secured together to form a unitary composite structure which, in turn, may be secured as by a hinge to one of sheets 18 or 20 or may have its end between the sheets within hinge 22. In the form shown, however, film unit 10 preferably has each of film 12 and base 16 separately attached to sheet 18 by suitable hinges 24 and 26, respectively, with film 12 adjacent to sheet 20. Container 14 preferably adjoins hinges 24 and 26 and is detachably secured to either of the latter elements. Base 16 is preferably provided with suitable perforations whereby it may be readily detached from the remainder of the film unit after the positive image is formed in or on the base. Hinge 22 is preferably provided with a suitable tab or longitudinal extension 32.

Each of sheets 18 and 20 is preferably larger in area than film unit 10 and has edge portions extending beyond the edges of the film unit on all sides thereof. In order that the edge portions of sheets 18 and 20 may absorb the overflow of reagent which is squeezed from film unit 10, the sheets are preferably formed of a relatively liquid-absorbent material such as paper, or are coated along the edge portions thereof with such material, thereby insuring that none of the reagent escapes from the film assembly. In addition, the edges of at least one of sheets 18 and 20, for example of sheet 18, are preferably provided with a suitable adhesive 34 whereby superimposition of the sheets into face-to-face relation causes them to adhere to one another and to form a lighttight seal around film unit 10. The adhesive is selected so that the adhesion obtained is not very great and permits the sheets to be readily separated from one another when the image-forming reaction is complete and base 16 is to be separated from the remainder of the assembly.

With the above-described composite photographic film assembly of film unit 10 and sheets 18 and 20, it is possible by folding back sheet 20 in a magazine of the herein disclosed type to expose unit 10, and then, by bringing sheets 18 and 20 into face-to-face engagement as the film assembly is withdrawn from the magazine, to withdraw the assembly into daylight without further exposing film unit 10 to actinic light. Thus, the image-forming reaction may be carried out in daylight.

It will be noted that while the assembly described above may be withdrawn from the magazine subsequent to the exposure of film unit 10 without further exposing the photosensitive layer of the film unit, the assembly must nevertheless be operatively positioned within the magazine in the absence of actinic light, for if sheet 20 is folded back in the presence of actinic light, fogging of the photosensitive layer of film unit 10 will result. To make possible loading of the film assembly into the magazine in daylight, the film assembly is preferably provided with a light-impervious envelope or other suitable, readily removable means whereby the film assembly may be positioned within a magazine, sheet 20 folded back, and then the magazine rendered lighttight. Thereafter, the light-impervious envelope may be separated from the assembly and removed from the magazine, leaving film unit 10 in condition for exposure.

In one form thereof, the light-impervious envelope, shown at 30 in Fig. 2, is formed, for example, of black paper, the envelope preferably substantially enclosing film unit 10 so that one of its faces extends between film unit 10 and sheet 18. However, it is to be understood that sheet 18 may be secured to film unit 10 throughout the area thereof, in which case the envelope is adapted to enclose both film unit 10 and sheet 18. Envelope 30 is preferably elongated or is provided with an end tab or extension such that a substantital portion thereof will extend beyond the ends of sheets 18 and 20 when the latter are operatively folded upon said envelope.

Figure 4:
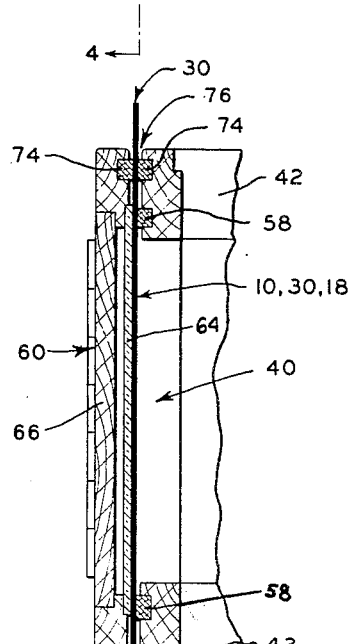
Fig. 4 is a sectional view taken substantially along line 4—4 of Fig. 3.

In accordance with the present invention there is provided a novel magazine which is adapted to render operative the film assembly described above. The magazine is so constructed and arranged that it may be readily mounted on a properly equipped camera or other photographic apparatus. One form of the magazine is shown in Figs. 3 and 4 as comprising a front section 40 which may be detachably secured by suitable fastening means to the rear of a camera 42. In the form shown, the fastening means includes the shoulders 43, the remainder of the fastening means being of conventional design and not being shown for the purpose of clarity. As shown, front section 40 has an exposure opening which provides a path through which actinic light from the camera lens may enter the magazine. Around the exposure opening, defined by front section 40, there is preferably mounted in a suitable groove a strip 58 of a deformable material such as felt.

Front section 40 is further provided with a depending extension 44 (Fig. 4) which serves to mount a suitable bracket 46. Operatively mounted on bracket 46 are a pair of pressure rollers 48 and 50, the tension exerted by the rollers upon sheet material passing therebetween being subject to accurate control by a suitable mechanism 52 which may be manually adjusted and which is operatively connected to said rollers to control the displacement of the axes thereof with respect to one another. Suitable means are provided for operating rollers 48, 50 from the exterior of the camera and, as shown, said means comprise a handle, knob or other manually operable mechanism 54 connected to one of said rollers. A suitable curved element, which may be composed for example of sheet metal, cooperates with roller 50 and the bottom edge of extension 44 to provide a guideway 56 for a cover sheet of the novel film assembly described above.

A rear section 60 is pivotally connected to front section 40 by a suitable hinge means 62 (Fig. 3), the edge portions of the rear section and the edge portions of the front section being so constructed as to be in lighttight engagement with one another when aligned and juxtaposed. Suitable means, such as lock 63, are provided for securing rear section 60 to front section 40 in aligned and juxtaposed relation.

Rear section 60 is preferably provided with a ground glass 64 (Fig. 4) resiliently urged by suitable means (not shown) toward front section 40. Ground glass 64 is provided as a guide means for predeterminedly positioning a film assembly within the magazine and as a focusing means for use when the film assembly is not so predeterminedly positioned. Rear section 60 is equipped with a conventional rear door or shuttter 66 which is hinged to the rear section behind the ground glass and is normally held shut as by means of suitable springs (not shown). Rear section 60 comprises a housing structure 68 at its lower end which encloses mechanism 52.

In accordance with the present invention, means providing a pair of lighttight passages communicating with the interior of the magazine are provided. The lower edge portion of front section 40 defines, in conjunction with the lower edge portion of rear section 60, a passage 72 through which the film assembly may be removed from within the magazine following exposure of the photosensitive layer. This passage is rendered lighttight by suitable light-seal means, such as felt strips 70. Similarly, the upper edge portion of front section 40 defines, in conjunction with the upper edge portion of rear section 60, a passage 76 through which envelope 30 may be removed from within the magazine prior to exposure of the photosensitive layer. This passage is rendered lighttight by suitable light-seal means such as felt strips 74.

In operation, rear section 60 of the magazine is swung open and the novel film assembly described above is inserted therewithin so that tab 32 of hinge connection 22 extends between pressure rollers 48, 50 and thence beyond the lower edge portion of front section 40. Cover sheet 20 is folded back and fed through guideway 56 and thence beyond the lower edge portion of front section 40. Envelope 30 is so positioned as to project beyond the upper edge portion of front section 40. Thereafter, rear section 60 is pivoted into operative engagement with front section 40 whereby the interior of the magazine is rendered lighttight. Envelope 30 now is removed from the film assembly through opening 76 whereby film unit 10 is placed in condition for exposure in the focal plane of the camera with which the magazine is associated. After film unit 10 is exposed, pressure rollers 48, 50 are manually operated from the exterior of the camera so that the assembly comprising film unit 10 and sheets 18 and 20 is fed between the rollers and discharged from the camera through opening 72. The compressive force applied by the rollers causes the reagent held by container 14 of film unit 10 to be released from the container and to be uniformly spread, after release, throughout the entire area of the exposed frame of film 12. The film assembly, when discharged from the camera, is permitted to remain lighttight until a sufficient time has elapsed to form a positive image in or on base 16. Thereafter sheets 18 and 20 are separated from one another, film 12 is separated from base 16, and the latter is detached from the remainder of the film assembly whereby a finished, fixed positive image of the subject matter to which the film unit was exposed is provided.

It will be noted that in the above-described embodiment of the film assembly there is obtained a positive image which is reversed left and right geometrically with respect to the subject matter photographed. To obtain a true unreversed image of the subject matter photographed, a novel modification of the film assembly described above may be utilized. One form of such embodiment is shown diagrammatically in Figs. 5 and 6 operatively mounted in the above-described magazine which is shown as comprising rear section 60 and front section 40, the separation of the several laminae of the assembly being greatly exaggerated in the drawings for purposes of clarity.

The film assembly preferably comprises a pair of cover sheets 18a and 20a of similar construction to sheets 18 and 20 of the above-described embodiment. Adjacent to sheet 18a there is secured a frame of a photosensitive film 12a corresponding to film 12, and adjacent to sheet 20a there is secured a base 16a corresponding to base 16. A suitable container 14a for the liquid reagent is provided between film 12a and base 16a and may be attached to the inner face, for example, of either the film or the base, or to the hinged connection 22a for sheets 18a and 20a. To permit loading of this novel film assembly into the magazine, a light-impervious envelope 30a may be provided to enclose sheet 18a and film 12a or to enclose only film 12a.

In use, this modification of the film assembly is inserted into the magazine with sheet 20a foremost, and cover sheet 20a, together with base 16a, is folded back so as to extend through the guideway of the camera attachment adjacent to roller 50 and through passage 72. After envelope 30a has been removed from the magazine, film unit 10 may be exposed. Thereafter, the film assembly is advanced between pressure rollers 48 and 50 and discharged from the camera. A positive image of the subject matter to which film 12a was exposed is formed in or on base 16a. Base 16a may be detachably adhered to sheet 18a so as to be readily removable therefrom after the positive image is formed therein or thereon. In this embodiment of the invention, it is possible to provide sheet 18a with a photosensitive layer and thereby to avoid the use of a distinct photosensitive element such as film 12a.

It is to be understood that magazine 40, 60, with the film assembly loaded therein, may be provided as a film pack for cameras equipped to receive it. Envelope 30 may be operatively positioned to shield the photosensitive layer in the pack whereby the latter may be operatively mounted in the camera in the presence of actinic light or the pack may be assembled without said envelope and mounted in the camera in the absence of actinic light as, for example, in a dark room.

It is furthermore to be understood that magazine 40, 60 may be used in conjunction with photographic apparatus, other than camera apparatus of conventional design, such for example as X-ray, ultraviolet and infrared apparatus. When magazine 40, 60 is used in conjunction with X-ray apparatus, front section 40, if constructed of material transparent to X-ray radiation, such as wood or a plastic material, may be provided with a solid face portion rather than a face portion providing an opening. When magazine 40, 60 is composed of a material that substantially attenuates X-radiation, such as metal, the exposure opening may be provided with a plastic panel which is opaque to actinic light but transparent to X-radiation.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. A magazine for use in photography comprising a front section and a rear section, pivot means connecting said front and rear sections, at least one of said sections having edge portions which include shoulders therealong, the edge portions of said front section, when aligned and juxtaposed with the edge portions of said rear section, being so constituted as to be in lighttight engagement therewith, said front and rear sections defining a chamber when the edge portions of said rear section are aligned and juxtaposed with the edge portions of said front section, a guide associated with at least one of said front and rear sections for locating a film assembly at a predetermined position within said chamber, at least one of said sections providing a path for radiation actinic to a photosensitive layer of said film assembly, a pair of edge portions of said front section defining, in conjunction with a pair of edge portions of said rear section, a pair of elongated passages, light-seal means affixed to said pairs of edge portions for rendering said pair of elongated passages lighttight, a pair of pressure-applying rollers positioned for rotation within said chamber adjacent to and in alignment with one of said passages, said pressure-applying rollers having contiguous, pressure-applying, elongated, cylindrical surfaces medially located between the ends thereof, and a guide on one of said sections providing a smooth curved surface which is adjacent to the cylindrical surface of one of said rollers and which, with said cylindrical surface of said one of said rollers, defines a passage communicating with said chamber and with said one passage.

2. A magazine for use in photography comprising a front section and a rear section, pivot means connecting said front and rear sections, said front and rear sections defining a chamber when the edge portions of said rear section are aligned and juxtaposed with the edge portions of said front section, said front section providing a path for radiation actinic to a photosensitive layer of a film assembly positioned within said chamber, said rear portion having an opening, a ground glass window substantially coextensive with said opening, said ground glass window being adapted to enable the lens of a camera with which said magazine is associated to be focused, a closure means for said opening pivoted to said rear portion, said closure means, when in open position, permitting said ground glass window to be viewed and, when in closed position, preventing actinic radiation from passing through said opening, said ground glass window being adapted to locate a film assembly at a predetermined position within said chamber, a pair of edge portions of said front section defining, in conjunction with a pair of edge portions of said rear section a pair of elongated passages, light-seal means affixed to said pairs of edge portions for rendering said pair of elongated passages lighttight, and a pair of pressure-applying rollers positioned for rotation within said chamber adjacent to and in alignment with one of said elongated passages, said rollers providing contiguous, pressure-applying, elongated, cylindrical surfaces medially located between their ends.

3. A photographic magazine for a film unit which includes a photosensitive sheet, a photographic processing liquid for said photosensitive sheet, rupturable containing means for carrying said photographic processing liquid, another sheet and hinge means joining ends of said sheets and said containing means so that said containing means is located for releasing said photographic processing liquid between said sheets in order to process said photosensitive sheet, an envelope having walls which are opaque to radiation actinic to said photosensitive sheet, said envelope encompassing at least said photosensitive sheet in order to prevent it from being prematurely exposed, an end of said envelope extending beyond the end of said photosensitive sheet opposite to the first-mentioned end of said photosensitive sheet, said envelope being slidably associated with said photosensitive sheet so as to be readily slipped therefrom in a direction away from said hinge means, said magazine comprising a front section, a rear section movable with respect to said front section, the edge portions of said rear section being in lighttight engagement with the edge portions of said front section, said front and rear sections defining a chamber, said front section providing a path through which radiation actinic to said photosensitive sheet may enter said chamber, a pair of edge portions of said rear section defining, in conjunction with a pair of edge portions of said front section, a pair of elongated passages, light-seal means for rendering said pair of elongated passages lighttight, and a pair of pressure-applying members positioned within said chamber adjacent to and in alignment with one of said passages, each of said pressure-applying members providing an elongated, pressure-applying surface substantially as long as said one of said passages, said magazine being adapted to so carry said film unit that said hinge extends between said pressure-applying surfaces and through said one passage and said end of said envelope extends through the other passage of said pair.

4. A photographic magazine for a film assembly which includes a photosensitive sheet, a photographic processing liquid for said photosensitive sheet, rupturable containing means for carrying said photographic processing liquid, another sheet and hinge means joining ends of said sheets in said containing means so that said containing means is located for releasing said photographic processing liquid between said sheets in order to process said photosensitive sheet, an envelope having walls which are opaque to radiation actinic to said photosensitive sheet, said envelope encompassing said photosensitive sheet in order to prevent it from being prematurely exposed and an end of said envelope extending beyond the end of said photosensitive sheet opposite to the first-mentioned end of said photosensitive sheet, said envelope being slidably associated with said photosensitive sheet so as to be readily slipped therefrom in a direction away from said hinge means, said magazine comprising a front section and a rear section, pivot means connecting said front and rear sections, the edge portions of said front section and the edge portions of said rear section, when aligned and juxtaposed, being in lighttight engagement, said front and rear sections defining a chamber when the edge portions of said front and rear sections are aligned and juxtaposed, said front section providing a path for radiation actinic to said photosensitive sheet, a pair of edge portions of said front section and a pair of edge portions of said rear section defining a pair of elongated passages, light-seal means affixed to said pairs of edge portions for rendering said pair of elongated passages lighttight, a pair of pressure-applying rollers positioned for rotation within said chamber adjacent to and in alignment with one of said passages, said pressure-applying rollers having contiguous, elongated, pressure-applying, cylindrical surfaces medially located between their ends, and a guide on one of said sections providing a smooth curved surface which is adjacent to the cylindrical surface of one of said rollers and which, with said cylindrical surface of said one of said rollers, defines a passage communicating with said chamber and with said one passage, said magazine being adapted to so carry said film assembly that said hinge means extends between said pressure-applying surfaces and through said one passage, said end of said envelope extends through the other passage of said pair, and said other sheet extends through said passage defined by said guide and said one of said rollers and through said one passage.

5. A photographic magazine comprising a front section, a rear section pivoted to said front section, the sections being movable between a closed position and an open position, the edge portions of said rear section being in lighttight engagement with the edge portions of said front section when said sections are in closed position, said sections, when in closed position, defining a substantially planar chamber, said front section providing a path through which may pass radiation actinic to a photosensitive sheet within said chamber, a pair of opposed edge portions of said rear section defining, in conjunction with a pair of opposed edge portions of said front section, when said sections are in closed position, a pair of elongated passages, light-seal means for rendering said pair of elongated passages lighttight and a pair of pressure-applying members, one pressure-applying member of said pair being mounted on said front section adjacent to and in alignment with one of said passages, the other pressure-applying member of said pair being mounted on said rear portion adjacent to and in alignment with said one of said passages, said pair of pressure-applying members providing a pair of pressure-applying surfaces each substantially as long as said one of said passages, said pressure-applying surfaces being juxtaposed when said sections are in closed position and being separated when said sections are in open position, whereby said magazine is designed to carry a film unit containing said photosensitive sheet, said film unit, when said sections are in open position, being adapted to be so positioned between said sections and said pressure-applying members that when said sections are in closed position one end of said film unit extends between said pressure-applying surfaces and through said one passage and the other end of said film unit extends through the other passage of said pair.

References Cited in the file of this patent

UNITED STATES PATENTS

| | | |
|---|---|---|
| 822,501 | Becker | June 5, 1906 |
| 1,215,290 | London | Feb. 6, 1917 |
| 1,424,816 | Brillone | Aug. 8, 1922 |
| 2,150,372 | Goddard | Mar. 14, 1939 |
| 2,432,414 | Harvey | Dec. 9, 1947 |

FOREIGN PATENTS

| | | |
|---|---|---|
| 16,821 | Great Britain | of 1898 |
| 835,300 | France | Sept. 19, 1938 |